US009830527B2

(12) United States Patent
Margari et al.

(10) Patent No.: US 9,830,527 B2
(45) Date of Patent: Nov. 28, 2017

(54) IMAGE PROCESSING SYSTEM FOR EXTRACTION OF CONTEXTUAL INFORMATION AND ASSOCIATED METHODS

(71) Applicants: STMicroelectronics S.r.l., Agrate Brianza (IT); Universita Degli Studi Di Milano—Bicocca, Milan (IT)

(72) Inventors: Alberto Margari, Milan (IT); Danilo Pietro Pau, Sesto san Giovanni (IT); Raimondo Schettini, Schettini (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 14/593,413

(22) Filed: Jan. 9, 2015

(65) Prior Publication Data

US 2016/0203385 A1   Jul. 14, 2016

(51) Int. Cl.
*G06K 9/46* (2006.01)
*G06K 9/00* (2006.01)

(52) U.S. Cl.
CPC ....... *G06K 9/4642* (2013.01); *G06K 9/00805* (2013.01); *G06K 9/00973* (2013.01)

(58) Field of Classification Search
None
See application file for complete search history.

(56) References Cited

U.S. PATENT DOCUMENTS

| | | | |
|---|---|---|---|
| 2008/0052312 A1* | 2/2008 | Tang | G06F 17/30247 |
| 2010/0226575 A1* | 9/2010 | Grzeszczuk | G06F 17/30256 382/190 |
| 2011/0026770 A1* | 2/2011 | Brookshire | G05D 1/0251 382/103 |
| 2011/0255741 A1* | 10/2011 | Jung | G06K 9/00369 382/103 |
| 2012/0027290 A1* | 2/2012 | Baheti | G06K 9/6857 382/154 |

OTHER PUBLICATIONS

Felzenszwalb et al., "Object Detection with Discriminatively Trained Part-Based Models", IEEE Transaction on Pattern Analysis and Machine Intelligence, Sep. 2010.*
Baber et al., "BIG_OH: BInarization of Gradient Orientation Histograms", Image and Vision Computing, Aug. 30, 2014.*
(Continued)

*Primary Examiner* — Matthew Bella
*Assistant Examiner* — Brian Shin
(74) *Attorney, Agent, or Firm* — Gardere Wynne Sewell LLP

(57) ABSTRACT

An image processing system includes a first processor that acquires frames of image data. For each frame of data, the first processor generates a Gaussian pyramid for the frame of data, extract histogram of oriented gradient (HOG) descriptors for each level of the Gaussian pyramid, compresses the HOG descriptors, and sends the compressed HOG descriptors. A second processor is coupled to the first processor and is configured to receive the compressed HOG descriptors, aggregate the compressed HOG descriptors into windows, compare data of each window to at least one stored model, and generate output based upon the comparison.

26 Claims, 4 Drawing Sheets

(56) References Cited

OTHER PUBLICATIONS

Cortes, Corinna et al: "Support-Vector Networks," AT&T Labs-Research, USA, 31 pages.
Felzenszwalk, Petro et al: "A Discriminatively Trained, Multiscale, Deformable Part Model," 2008 IEEE (8 pages).
Felzenszwalk, Pedro F. et al: "Object Detection with Discriminatively Trained Part-Based Models," IEEE Transaction on Pattern Analysis and Machine Intelligence, vol. 32, No. 9, Sep. 2010 (pp. 1627-1645).
Dalal, Navneet et al: "Histograms of Oriented Gradients for Human Detection," 2005 IEEE Computer Society Conference on Computer Vision and Pattern Recognitiion (8 pages).
Ke, Yan et al: "PCA-SIFT: A More Distincitve Representation for Local Image Descriptors," 2004 IEEE Computer Society Conference on Copmputer Vision and Pattern Recognition (8 pages).
Cortes, Corinna et al: "Support-Vector Networks," AT&T Labs-Research, USA, 1995, pp. 1-31.
Dalal, Navneet et al: "Histograms of Oriented Gradients for Human Detection," 2005 IEEE Computer Society Conference on Computer Vision and Pattern Recognition (8 pages).
Felzenszwalb, Petro et al: "A Discriminatively Trained, Multiscale, Deformable Part Model," 2008 IEEE (8 pages).
Felzenszwalb, Pedro F. et al: "Object Detection with Discriminatively Trained Part-Based Models," IEEE Transaction on Pattern Analysis and Machine Intelligence, vol. 32, No. 9, Sep. 2010 (pp. 1627-1645).
Ke, Yan et al: "PCA-SIFT: A More Distinctive Representation for Local Image Descriptors," 2004 IEEE Computer Society Conference on Computer Vision and Pattern Recognition (8 pages).
Margari, Alberto et al: "Compression of Histogram of Oriented Gradient for Classification of Pedestrians and Vehicles in a Camera-Based System," Oct. 2013, Agrate, IT (23 pages).

\* cited by examiner

IMAGE PROCESSING SYSTEM FOR EXTRACTION OF CONTEXTUAL INFORMATION AND ASSOCIATED METHODS

FIELD OF THE DISCLOSURE

This disclosure is directed to the field of image processing, and, in particular, to the extraction of contextual information from images.

BACKGROUND

For economic and humanitarian reasons, it is desirable to decrease the number of traffic collisions between multiple vehicles, between vehicles and stationary objects, and between vehicles and moving objects such as humans. Accordingly, the development of image processing systems for vehicles that enable detection of an impending collision is desirable. In addition, the development of such image processing systems that are able to determine the context of an image, for example whether the object is a vehicle, stationary object, or person, is even more desirable since such a system can be used in a collision avoidance system installed in a vehicle.

Such collision avoidance systems can actuate the brakes or steering of a car, for example, so as to avoid an impending collision. The contextual information can be used to alter the brake or steering actuation of the car so as to help minimize economic loss, or so as to help avoid injury to a person during a collision between the vehicle and the person. One successful way to derive this contextual information from an image is to generate histogram of oriented gradient (HOG) descriptors from that image, and to analyze the HOG descriptors to derive the contextual information.

A variety of techniques used for extracting HOG descriptors exist. For example, two leading techniques are the Dalal-Triggs technique, and the Felzenszwalb technique. While these techniques are useful, the resulting data generated is voluminous. This can be a disadvantage in image processing systems utilizing multiple processors, as the bandwidth used to send this data between the multiple processors may not be available.

Therefore, further advances in the field of image processing so as to enable the extraction of HOG descriptors and the transmission of the HOG descriptors without the use of excessive bandwidth are desired.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

A system includes a first processor that acquires frames of image data. For each frame of data, the first processor generates a Gaussian pyramid for the frame of data, extracts histogram of oriented gradient (HOG) descriptors for each level of the Gaussian pyramid, compresses the HOG descriptors, and sends the compressed HOG descriptors. A second processor is coupled to the first processor and is configured to receive the compressed HOG descriptors, aggregate the compressed HOG descriptors into windows, compare data of each window to at least one stored model, and generate output based upon the comparison. The output indicates an impending physical collision or lack thereof.

The first processor may be configured to compress the HOG descriptors for each level of the Gaussian pyramid by binarizing each HOG descriptor for each level into a plurality of bins with each bin holding a binary value, selecting some of the plurality of bins, and generating the compressed HOG descriptors as the binary values of the selected bins.

The first processor may be configured to binarize each HOG descriptor by determining the binary values for the plurality of bins corresponding to that HOG descriptor by comparing each element of that HOG descriptor to a threshold value and generating the corresponding binary value based upon the comparison.

The first processor may be configured to compress the HOG descriptors for each level of the Gaussian pyramid by placing each HOG descriptor into a plurality of bins, transforming at least some bins, binarizing each transformed bin so that each bin holds a binary value, wherein the transforming includes performing an arithmetic operation on each bin using at least one other bin as an operand.

A method aspect is directed to a method of image processing. The method includes acquiring frames of image data from a camera. For each frame of data, an image processing system is used for generating a Gaussian pyramid for the frame of data, extracting histogram of oriented gradient (HOG) descriptors for each level of the Gaussian pyramid, and compressing the HOG descriptors. The image processing system is also used for aggregating the compressed HOG descriptors into windows, comparing data of each window to at least one stored model, and generating output based upon the comparison.

A further aspect is directed to a vehicle that includes a body, a camera carried by the body, and a first processor carried by the body and coupled to the camera. The first processor is configured to acquire frames of image data from the camera. For each frame of data, the first processor is configured to generate a Gaussian pyramid for the frame of data, extract histogram of oriented gradient (HOG) descriptors for each level of the Gaussian pyramid, compress the HOG descriptors, and send the compressed HOG descriptors. A second processor is carried by the body, and coupled to the first processor. The second processor is configured to receive the compressed HOG descriptors, aggregate the compressed HOG descriptors into windows, compare data of each window to at least one stored model, and generate output based upon the comparison.

DETAILED DESCRIPTION

One or more embodiments of the present disclosure will be described below. These described embodiments are only examples of the presently disclosed techniques. Additionally, in an effort to provide a concise description, all features of an actual implementation may not be described in the specification.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
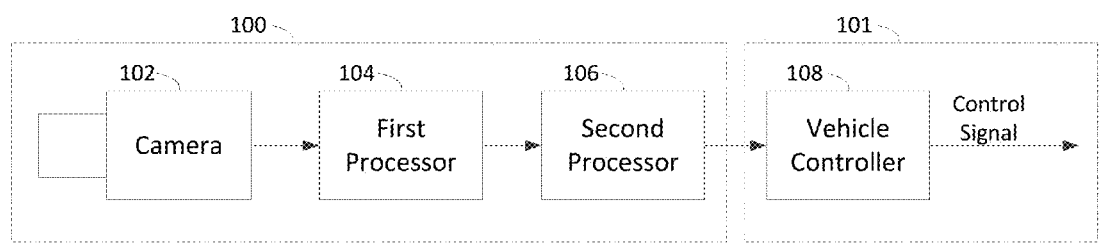
FIG. 1 is a block diagram of an image processing system as in use in a vehicle equipped with a collision avoidance system.

With reference to FIG. 1, an image processing system 100 for use with a vehicle collision avoidance system 101 is now described. The image processing system 100 includes a digital video camera 102, such as a charge coupled device camera or other suitable digital camera. The digital video camera 102 is mounted such that it captures frames of image data of the surroundings of the vehicle, such as the area in front of the vehicle. A first processor 104, such as a microprocessor, microcontroller, or system on a chip, is coupled to the digital video camera 102 to receive the frames of image data captured thereby. In some instances, the first processor 104 may be part of a package including the digital video camera 102, although it need not be.

In operation, the first processor 104 receives the frames of image data captured by the digital video camera 102. This capturing may be performed at 10 frames per second, for example, and at a resolution of 1280×800 pixels, for example. The first processor 104 then extracts information about the frames of image data, and compresses the extracted information. The first processor 104 then sends the compressed information to a second processor 106, via either a wired or a wireless connection.

The second processor 106 then extracts contextual information about the surroundings of the vehicle from the compressed information and uses this contextual information to determine whether there is an impending collision between the vehicle and another object, such as a vehicle, person, or stationary item. If the second processor 106 does determine that there is an impending collision between the vehicle and the object, it sends information about the impending collision, such as a distance to the object, rate of change of distance between the vehicle and the object, location of the object, and type of object, to a vehicle controller 108 that makes up part of a vehicle collision avoidance system 101. The vehicle controller 108 then generates a control signal to control one or more components of the vehicle (i.e. brakes, steering, etc.) so as to cause the vehicle to avoid the collision, or to minimize the force of the collision.

Figure 2:
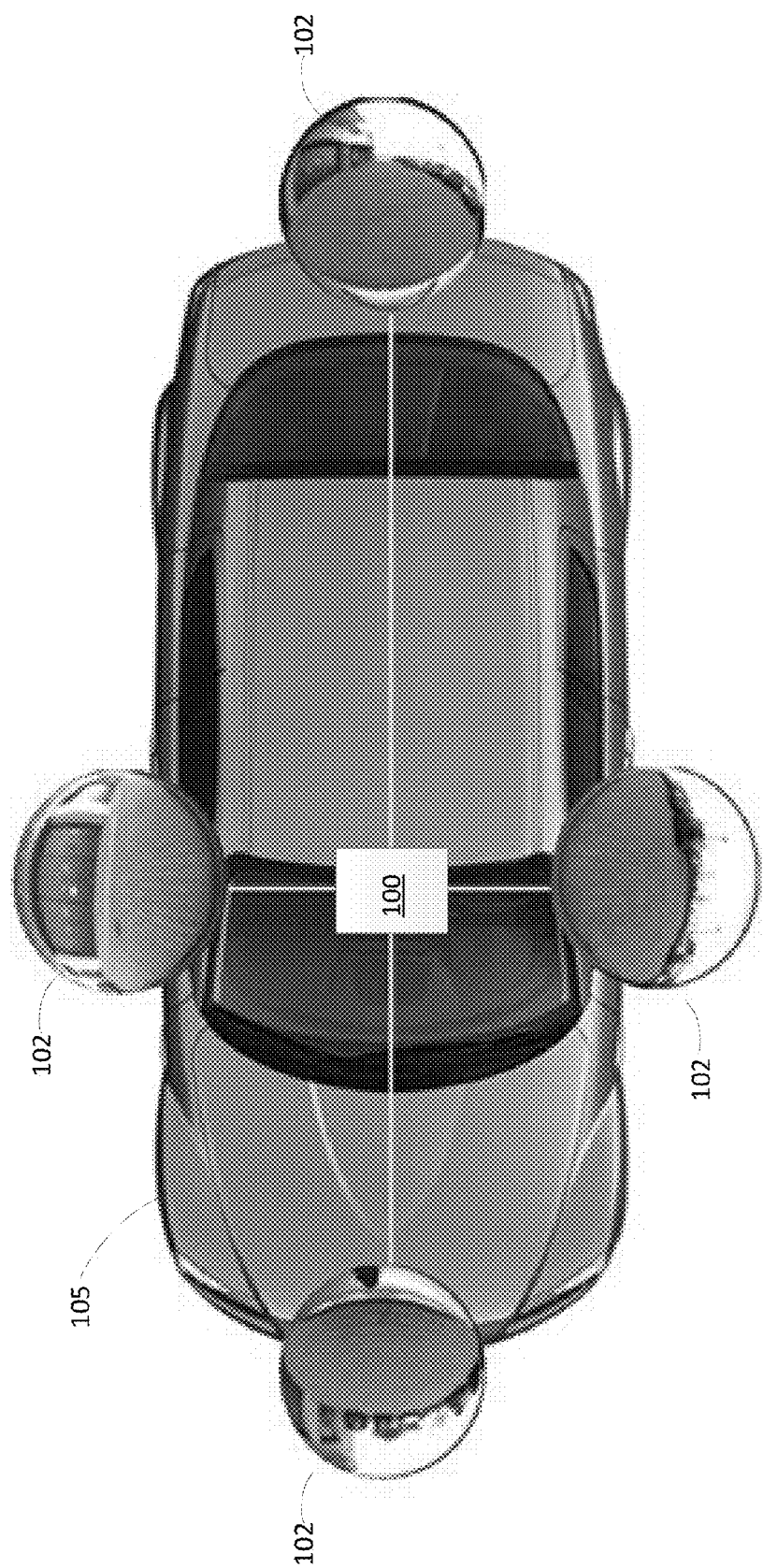
FIG. 2 is a block diagram of the image processing system of FIG. 1 in a vehicle equipped with a collision avoidance system and multiple digital video cameras.

It should be understood that in some applications, there may be multiple digital video cameras 102 for use with the same image processing system 100, as shown in FIG. 2, or there may be multiple image processing systems 100, each with its own respective digital video camera or cameras 102.

Figure 3:
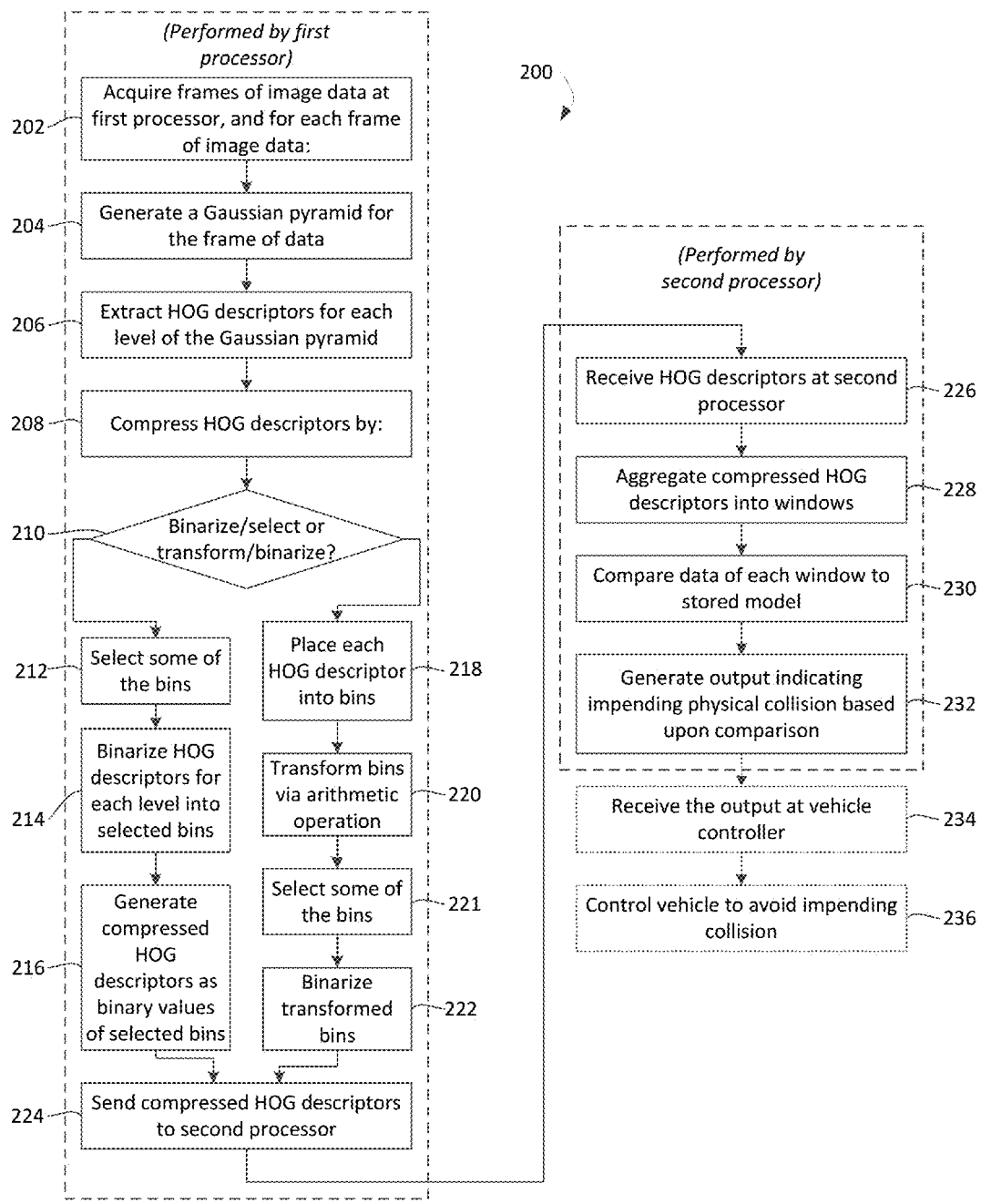
FIG. 3 is a flowchart showing details of the processing performed by the image processing system of FIG. 1, as calculated by the image processing system of FIG. 1.

The various processing techniques used by the first processor 104 and second processor 106 will now be explained in greater detail with reference to the flowchart 200 of FIG. 3. First, steps taken by the first processor 104 will be explained.

Figure 4:
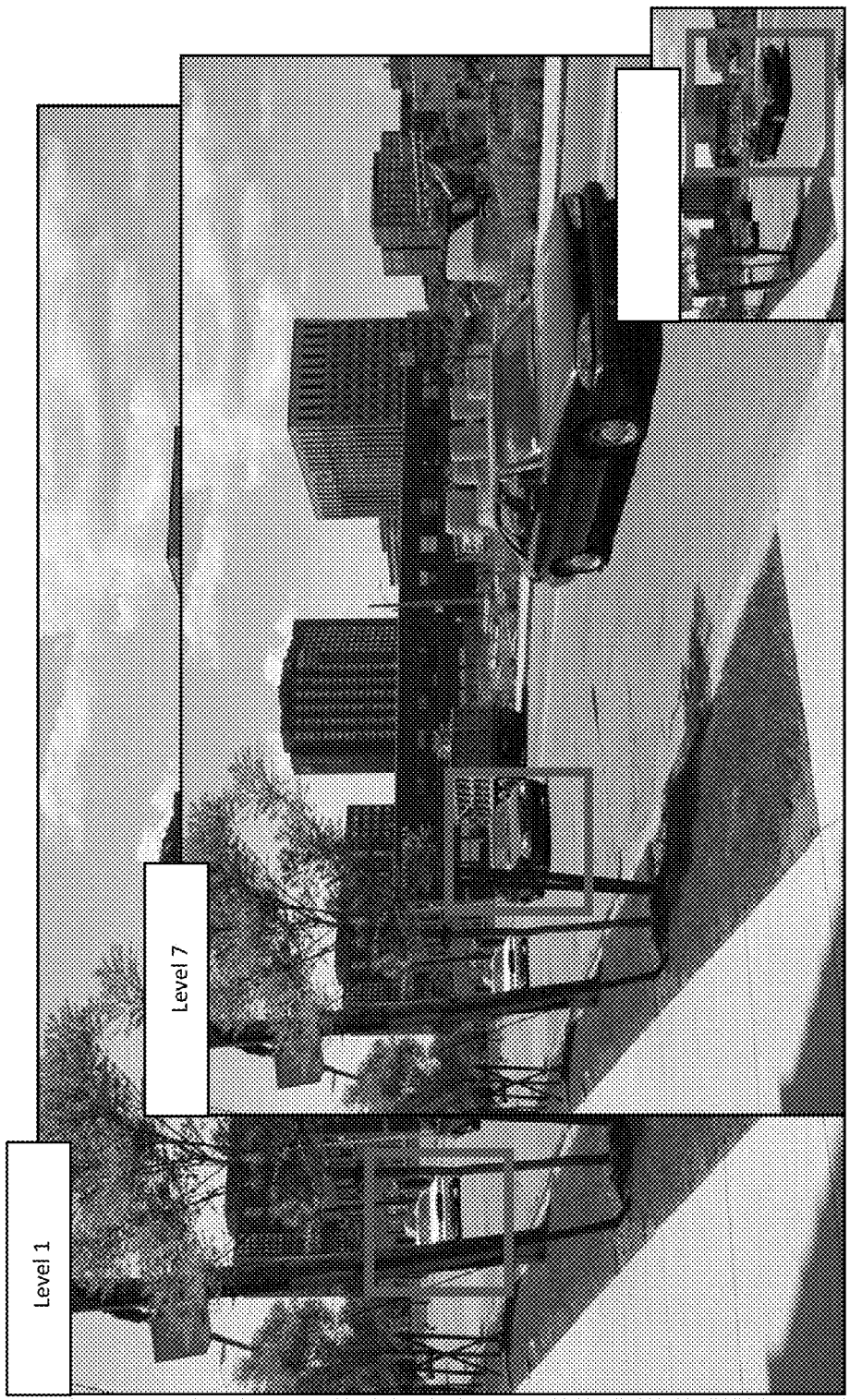
FIG. 4 is a visual representation of frames of levels of a Gaussian pyramid.

Frames of image data taken by the digital video camera are acquired by the first processor (Step 202). Then, for each frame of image data, a Gaussian pyramid is generated (Step 204). The Gaussian pyramid is invariant to the scale of the image, with a first level being the original captured frame of image data and maintaining the original resolution, and with each subsequent level being generated by subsampling the previous level by a factor of $\sqrt[7]{2}$. The inventors have found it useful to build the Gaussian pyramid to have 19 levels, although it should be appreciated that differing numbers of levels may be used in different applications. For example, in some applications 40 levels may be used. The more levels that are used, the greater the size of the objects that can be detected. Each level of the Gaussian pyramid has a round resolution, which allows the height and width of the pictures to be in multiples of 8. Thus, starting with a resolution of 1280×800 for the original frame of image data, the $19^{th}$ level of the Gaussian pyramid has a resolution of 208×128. Sample images from the $1^{st}$ level and $7^{th}$ level of the Gaussian pyramid are shown in FIG. 4. These images demonstrate the invariance to the scale of the images.

Next, histogram of oriented gradient (HOG) descriptors are extracted from each level of the Gaussian pyramid (Step 206). The Felzenszwalb et al. method of extracting HOG descriptors is used. This method is detailed in the publication P. F. Felzenszwalb, R. B. Grishick, D. McAllester, and D. Ramanan, Object Detection With Discriminatively Trained Part Based Models, IEEE Conference on Computer Vision and Pattern Recognition (CVPR) 2008, which is hereby incorporated by reference in its entirety to the maximum extent allowable under the law. Other methods of HOG descriptor extraction are also usable, for example the Dalal and Triggs method, detailed in N. Dalal and B. Triggs, Histograms of Oriented Gradients for Human Detection, IEEE Conference on Computer Vision and Pattern Recognition CVPR, 200, which is hereby incorporated by reference in its entirety to the maximum extent allowable under the law.

Each HOG descriptor is a 31 orientation histogram, and includes three components: a contrast sensitive component, a contrast insensitive component, and a gradient energy component. The contrast sensitive components make up 18 of the 31 orientations, while the contrast insensitive components make up 9 of the 31 orientations, and the gradient energy components make up the remaining 4 of the 31 orientations.

If the HOG descriptors were to be sent to the second processor once calculated, the data to be transferred could demand a large bandwidth in order to transfer the data quickly enough for the image processing system to work in real time with the collision avoidance system to help the vehicle avoid collisions. For example, the inventors have found that a bandwidth of around 854 Mbps would be helpful to transmit the HOG descriptors from the first processor to the second processor. Since achieving this bandwidth could serve to increase the price of the image processing system by an undesirable amount, the HOG descriptors are compressed before being sent to the second processor (Step 210).

The HOG descriptors may be compressed by one of two methods, either (1) selection and then binarization, or (2) transformation, selection and then binarization (Step 210). Selection and then binarization will now be described.

Next, selection is performed on the bins (Step 214). This selection may be performed a variety of ways. For example, a first selection method includes selecting each bin. By using this selection method, the bandwidth used to transmit the HOG descriptor is reduced by a factor of 32.

A second selection method includes selecting the contrast sensitive bins and the contrast insensitive bins, but not the gradient energy bins. The resulting bandwidth used to transmit the HOG descriptor when this selection method is employed is lowered by a factor of 36.

A third selection method includes selecting the contrast sensitive bins and the gradient energy bins, but not the contrast insensitive bins. By using this selection method, the bandwidth used to transmit the HOG descriptor is reduced by a factor of 45.

A fourth selection method includes selecting the contrast sensitive bins, but not the contrast insensitive bins and the gradient energy bins. The resulting bandwidth used to transmit the HOG descriptor when this selection method is employed is lowered by a factor of 55

A fifth selection method includes selecting the contrast insensitive bins and the gradient energy bins, but not the contrast sensitive bins. By using this selection method, the bandwidth used to transmit the HOG descriptor is reduced by a factor of 76.

A sixth selection method includes selecting the contrast insensitive bins, but not the contrast sensitive bins and the gradient energy bins. The resulting bandwidth used to transmit the HOG descriptor when this selection method is employed is lowered by a factor of 110.

A seventh selection method includes the selection of at least some contrast sensitive bins, some contrast insensitive bins, and some gradient energy bins. In this method, pairs of adjacent contrast sensitive bins are selected, with an unselected contrast sensitive bin left between each pair of selected adjacent contrast sensitive bins. Individual contrast insensitive bins are selected, with a pair of adjacent unselected contrast insensitive bins left between selected contrast insensitive bins. Each gradient energy bin is selected. It should be noted that the bins are allocated by the angle of their respective gradient, and that in this selection method, the contrast sensitive bins having angles of 20°, 40°, 80°, 100°, 140°, 160°, 200°, 220°, 260°, 280°, 320°, and 340° are selected, and the contrast insensitive bins having angles of 0°, 60°, and 120° are selected. The resulting bandwidth used to transmit the HOG descriptor when this selection method is employed is lowered by a factor of 52.

An eighth selection method includes the selection of at least some contrast sensitive bins, some contrast insensitive bins, and some gradient energy bins. In this method, single contrast sensitive bins are selected, with a pair of adjacent unselected contrast sensitive bins left between selected contrast sensitive bins. Pairs of adjacent contrast insensitive bins are selected, with an unselected contrast insensitive bin left between each pair of selected adjacent contrast insensitive bins. Each gradient energy bin is selected. Stated differently, in this selection method, the contrast sensitive bins having angles of 0°, 60°, 120°, 180°, 240°, and 300° are selected, and the contrast insensitive bins having angles of 20°, 40°, 80°, 100°, 140°, 160° are selected. The resulting bandwidth used to transmit the HOG descriptor when this selection method is employed is lowered by a factor of 62.

To perform the binarization (Step 214), each orientation of each HOG descriptor is compared to a threshold value. If the orientation is greater than or equal to the threshold, a first binary value (i.e., 1) is placed into a bin representing that orientation. If the orientation is less than the threshold, a second binary value (i.e., 0) is placed into a bin representing that orientation. This can be represented mathematically by the following:

Let each HOG be represented as a 31-orientation histogram V, and let t represent the threshold. Three different thresholds t are used, one for the contrast sensitive orientations, one for the contrast insensitive orientations, and one for the gradient energy orientations. To produce the binarized HOG features B={b(1), b(2), . . . , b(31)}, the following is performed.

$$b(n) = \begin{cases} 1 \text{ if } v(n) \geq t \\ 0 \text{ if } v(n) < t \end{cases}$$

Due to the selection and binarization, the compressed HOG descriptors are generated as binary values of the selected bins (Step 216).

The second HOG descriptor compression method is now described. Here, the first processor compresses the HOG descriptors for each level of the Gaussian pyramid by placing each descriptor into bins (Step 218), transforming at least some of the bins (Step 220), selecting some of the bins (Step 221) and then binarizing each transformed bin so each transformed bin holds a binary value (Step 222). The transforming itself is done by performing an arithmetic operation on the transformed bins.

As with the first HOG descriptor compression method, each HOG descriptor includes contrast sensitive orientations, contrast insensitive orientations, and gradient energy orientations. In a first transformation method, for some bins, subsequent contrast sensitive orientations are subtracted from preceding contrast sensitive orientations. For other bins multiple subsequent contrast sensitive orientations are summed, and then subtracted from a sum of multiple other subsequent contrast sensitive orientations.

The contrast insensitive orientations are not used, while the gradient energy orientations are not transformed. A table of sample specific arithmetic operations performed under this first HOG descriptor compression method is given below, in which "Sn" (with "n" representing the orientation) is used for the contrast sensitive orientations, and "En" (with "n" also representing the orientation) is used for the gradient energy orientations.

| First Transformation Method | |
|---|---|
| BIN1 | S1 − S18 > 0 |
| BIN2 | S2 − S1 > 0 |
| BIN3 | S3 − S2 > 0 |
| BIN4 | S4 − S3 > 0 |
| BIN5 | S5 − S4 > 0 |
| BIN6 | S6 − S5 > 0 |
| BIN7 | S7 − S6 > 0 |
| BIN8 | S8 − S7 > 0 |
| BIN9 | S9 − S8 > 0 |
| BIN10 | S10 − S9 > 0 |
| BIN11 | S11 − S10 > 0 |
| BIN12 | S12 − S11 > 0 |
| BIN13 | S13 − S12 > 0 |
| BIN14 | S14 − S13 > 0 |
| BIN15 | S15 − S14 > 0 |
| BIN16 | S16 − S15 > 0 |
| BIN17 | S17 − S16 > 0 |
| BIN18 | S18 − S17 > 0 |
| BIN19 | (S5 + S6 + S14 + S15) − 2 · (S1 + S10) > 0 |
| BIN20 | (S3 + S12) − (S8 + S17) > 0 |
| BIN21 | (S14 + S15) − (S5 + S6) > 0 |
| BIN22 | S1 − S10 > 0 |
| BIN23 | (S1 + S3 + S5 + S7 + S9 + S11 + S13 + S15 + S17) − (S2 + S4 + S6 + S8 + S10 + S12 + S14 + S16 + S18) > 0 |
| BIN24 | (S1 + S2 + S3 + S4 + S5 + S6 + S7 + S8 + S9) − (S10 + S11 + S12 + S13 + S14 + S15 + S16 + S17 + S18) > 0 |
| BIN25 | E1 > threshold |
| BIN26 | E2 > threshold |
| BIN27 | E3 > threshold |
| BIN28 | E4 > threshold |

After transformation, the resulting bins are then binarized, as described above. The binarization is also represented in the chart presented above, by the comparison signs. Thus, for example, to calculate the binary value that will ultimately reside in BIN1, the contents of S18 are subtracted from the contents of S1, and the result is compared to zero. If the result is greater than zero, a first binary value (i.e., 1) will be placed in BIN1, and if the result is less than zero, a second binary value (i.e., 0) will be placed in BIN1. The resulting bandwidth used to transmit the HOG descriptor when this transformation method is employed is lowered by a factor of 35.

A second transformation method is now described. In this transformation method, for some contrast sensitive orientations, a first group of four consecutive contrast sensitive orientations are added together, and then a second group of consecutive contrast sensitive orientations is added together and subtracted from the sum of first group of four consecutive contrast sensitive orientations. For some contrast sensitive orientations, a first group of two consecutive contrast sensitive orientations are added together, and then a second group of two consecutive contrast sensitive orientations is added together and subtracted from the sum of the first group of two consecutive contrast sensitive orientations. For yet other contrast sensitive orientations, a first group of eight consecutive contrast sensitive orientations are added together, and then a second group of eight consecutive contrast sensitive orientations is added together and subtracted from the sum of the first group of eight consecutive contrast sensitive orientations.

The contrast insensitive orientations are not placed into bins, while the gradient energy orientations are not transformed before being placed into bins. A table of sample specific arithmetic operations performed under this second HOG descriptor compression method is given below, in which "Sn" (with "n" representing the orientation) is used for the contrast sensitive orientations, and "En" (with "n" also representing the orientation) is used for the gradient energy orientations.

| Second Transformation Method | |
|---|---|
| BIN1 | (S2 + S3 + S4 + S5) − (S18 + S1 + S2 + S3) > 0 |
| BIN2 | (S4 + S5 + S6 + S7) − (S2 + S3 + S4 + S5) > 0 |
| BIN3 | (S6 + S7 + S8 + S9) − (S4 + S5 + S6 + S7) > 0 |
| BIN4 | (S8 + S9 + S10 + S11) − (S6 + S7 + S8 + S9) > 0 |
| BIN5 | (S10 + S11 + S12 + S13) − (S8 + S9 + S10 + S11) > 0 |
| BIN6 | (S12 + S13 + S14 + S15) − (S10 + S11 + S12 + S13) > 0 |
| BIN7 | (S14 + S15 + S16 + S17) − (S12 + S13 + S14 + S15) > 0 |
| BIN8 | (S16 + S17 + S18 + S1) − (S14 + S15 + S16 + S17) > 0 |
| BIN9 | (S18 + S1 + S2 + S3) − (S16 + S17 + S18 + S1) > 0 |
| BIN10 | (S5 + S6 + S14 + S15) − 2 · (S1 + S10) > 0 |
| BIN11 | (S3 + S12) − (S8 + S17) > 0 |
| BIN12 | (S14 + S15) − (S5 + S6) > 0 |
| BIN13 | S1 − S10 > 0 |
| BIN14 | (S1 + S3 + S5 + S7 + S9 + S11 + S13 + S15 + S17) − (S2 + S4 + S6 + S8 + S10 + S12 + S14 + S16 + S18) > 0 |
| BIN15 | (S1 + S2 + S3 + S4 + S5 + S6 + S7 + S8 + S9) − (S10 + S11 + S12 + S13 + S14 + S15 + S16 + S17 + S18) > 0 |
| BIN16 | E1 > threshold |
| BIN17 | E2 > threshold |
| BIN18 | E3 > threshold |
| BIN19 | E4 > threshold |

After transformation, the resulting bins are then binarized, as described above. The resulting bandwidth used to transmit the HOG descriptor when this transformation method is employed is lowered by a factor of 52.

A third transformation method is now described. In this transformation method, some bins include two adjacent contrast sensitive orientations, with the preceding bin being subtracted from the subsequent bin. This difference is then compared to zero, and the subsequent bin is then compared to a next bin. If the difference is greater than zero, and if the subsequent bin is greater than the next bin, then a first binary value (i.e., 1) is placed in the bin. If the difference is less than zero, or if the subsequent bin is less than the next bin, then a second binary value (i.e., 0) is placed in the bin. In this method, some bins include the sum of two consecutive contrast sensitive orientations with two other consecutive contrast sensitive orientations, less the sum of two other contrast sensitive orientations, prior to binarization. In yet other bins, a difference between two nonconsecutive contrast sensitive orientations, prior to binarization, is included. In still further bins, a sum of nine nonconsecutive contrast sensitive orientations is subtracted from a sum of nine other nonconsecutive contrast sensitive orientations.

The contrast insensitive orientations are not used, while the gradient energy orientations are not transformed. A table of sample specific arithmetic operations performed under this third HOG descriptor compression method is given below, in which "Sn" (with "n" representing the orientation) is used for the contrast sensitive orientations, and "En" (with "n" also representing the orientation) is used for the gradient energy orientations.

| Third Transformation Method | |
|---|---|
| BIN1 | S1 − S18 > 0 AND S1 > S2 |
| BIN2 | S2 − S1 > 0 AND S2 > S3 |
| BIN3 | S3 − S2 > 0 AND S3 > S4 |
| BIN4 | S4 − S3 > 0 AND S4 > S5 |
| BIN5 | S5 − S4 > 0 AND S5 > S6 |
| BIN6 | S6 − S5 > 0 AND S6 > S7 |
| BIN7 | S7 − S6 > 0 AND S7 > S8 |
| BIN8 | S8 − S7 > 0 AND S8 > S9 |
| BIN9 | S9 − S8 > 0 AND S9 > S10 |
| BIN10 | S10 − S9 > 0 AND S10 > S11 |
| BIN11 | S11 − S10 > 0 AND S11 > S12 |
| BIN12 | S12 − S11 > 0 AND S12 > S13 |
| BIN13 | S13 − S12 > 0 AND S13 > S14 |
| BIN14 | S14 − S13 > 0 AND S14 > S15 |
| BIN15 | S15 − S14 > 0 AND S15 > S16 |
| BIN16 | S16 − S15 > 0 AND S16 > S17 |
| BIN17 | S17 − S16 > 0 AND S17 > S18 |
| BIN18 | S18 − S17 > 0 AND S18 > S1 |
| BIN19 | (S5 + S6 + S14 + S15) − 2 · (S1 + S10) > 0 |
| BIN20 | (S3 + S12) − (S8 + S17) > 0 |
| BIN21 | (S14 + S15) − (S5 + S6) > 0 |
| BIN22 | S1 − S10 > 0 |
| BIN23 | (S1 + S3 + S5 + S7 + S9 + S11 + S13 + S15 + S17) − (S2 + S4 + S6 + S8 + S10 + S12 + S14 + S16 + S18) > 0 |
| BIN24 | (S1 + S2 + S3 + S4 + S5 + S6 + S7 + S8 + S9) − (S10 + S11 + S12 + S13 + S14 + S15 + S16 + S17 + S18) > 0 |
| BIN25 | E1 > threshold |
| BIN26 | E2 > threshold |
| BIN27 | E3 > threshold |
| BIN28 | E4 > threshold |

After transformation, the resulting bins are then binarized, as described above. The resulting bandwidth used to transmit the HOG descriptor when this transformation method is employed is lowered by a factor of 35.

A fourth transformation method is now described. Here, some bins include four groups of contrast sensitive orientations. The first group of contrast sensitive orientations includes the sum of four consecutive contrast sensitive orientations, while the second group of contrast sensitive orientations includes the sum of four consecutive contrast sensitive orientations that includes two contrast sensitive orientations of the first group, and two consecutive and preceding contrast sensitive orientations. The third group is the same as the first group, while the fourth group includes the sum of four consecutive contrast sensitive orientations that includes two contrast sensitive orientations of the first group, and two consecutive and subsequent contrast sensitive orientations. The second group is subtracted from the first group, and the result is compared to zero. The fourth group is subtracted from the third group, and the result is compared to zero. If both results are greater than zero, then a first binary value (i.e., 1) is placed in the bin. If either result is less than zero, then a second binary value (i.e., 0) is placed in the bin.

In this method, some bins include the sum of two consecutive contrast sensitive orientations with two other consecutive contrast sensitive orientations, less the sum of two other orientations, prior to binarization. In yet other bins, a difference between two nonconsecutive contrast sensitive orientations, prior to binarization, is included. In still further bins, a sum of nine nonconsecutive contrast sensitive orientations is subtracted from a sum of nine other nonconsecutive contrast sensitive orientations.

The contrast insensitive orientations are not used, while the gradient energy orientations are not transformed. A table of sample specific arithmetic operations performed under this third HOG descriptor compression method is given below, in which "Sn" (with "n" representing the orientation) is used for the contrast sensitive orientations, and "En" (with "n" also representing the orientation) is used for the gradient energy orientations.

| Fourth Transformation Method | |
|---|---|
| BIN1 | $(S2 + S3 + S4 + S5) - (S18 + S1 + S2 + S3) > 0$ AND $(S2 + S3 + S4 + S5) - (S4 + S5 + S6 + S7) > 0$ |
| BIN2 | $(S4 + S5 + S6 + S7) - (S2 + S3 + S4 + S5) > 0$ AND $(S4 + S5 + S6 + S7) - (S6 + S7 + S8 + S9) > 0$ |
| BIN3 | $(S6 + S7 + S8 + S9) - (S4 + S5 + S6 + S7) > 0$ AND $(S6 + S7 + S8 + S9) - (S8 + S9 + S10 + S11) > 0$ |
| BIN4 | $(S8 + S9 + S10 + S11) - (S6 + S7 + S8 + S9) > 0$ AND $(S8 + S9 + S10 + S11) - (S10 + S11 + S12 + S13) > 0$ |
| BIN5 | $(S10 + S11 + S12 + S13) - (S8 + S9 + S10 + S11) > 0$ AND $(S10 + S11 + S12 + S13) - (S12 + S13 + S14 + S15) > 0$ |
| BIN6 | $(S12 + S13 + S14 + S15) - (S10 + S11 + S12 + S13) > 0$ AND $(S12 + S13 + S14 + S15) - (S14 + S15 + S16 + S17) > 0$ |
| BIN7 | $(S14 + S15 + S16 + S17) - (S12 + S13 + S14 + S15) > 0$ AND $(S14 + S15 + S16 + S17) - (S16 + S17 + S18 + S1) > 0$ |
| BIN8 | $(S16 + S17 + S18 + S1) - (S14 + S15 + S16 + S17) > 0$ AND $(S16 + S17 + S18 + S1) - (S18 + S1 + S2 + S3) > 0$ |
| BIN9 | $(S18 + S1 + S2 + S3) - (S16 + S17 + S18 + S1) > 0$ AND $(S18 + S1 + S2 + S3) - (S2 + S3 + S4 + S5) > 0$ |
| BIN10 | $(S5 + S6 + S14 + S15) - 2 \cdot (S1 + S10) > 0$ |
| BIN11 | $(S3 + S12) - (S8 + S17) > 0$ |
| BIN12 | $(S14 + S15) - (S5 + S6) > 0$ |
| BIN13 | $S1 - S10 > 0$ |
| BIN14 | $(S1 + S3 + S5 + S7 + S9 + S11 + S13 + S15 + S17) - (S2 + S4 + S6 + S8 + S10 + S12 + S14 + S16 + S18) > 0$ |
| BIN15 | $(S1 + S2 + S3 + S4 + S5 + S6 + S7 + S8 + S9) - (S10 + S11 + S12 + S13 + S14 + S15 + S16 + S17 + S18) > 0$ |
| BIN16 | $E1 >$ threshold |
| BIN17 | $E2 >$ threshold |
| BIN18 | $E3 >$ threshold |
| BIN19 | $E4 >$ threshold |

After transformation, the resulting bins are then binarized, as described above. The resulting bandwidth used to transmit the HOG descriptor when this transformation method is employed is lowered by a factor of 52.

In a fifth transformation method, for some bins, subsequent contrast sensitive orientations are subtracted from preceding contrast sensitive orientations. For some bins, there is a first group of nine consecutive contrast sensitive orientations that are added together, and there is a second group of nine consecutive contrast sensitive orientations successive to the contrast sensitive orientations of the first group that are added together. The second group is subtracted from the first group. For some other bins, there is a first group including a first four consecutive contrast sensitive orientations and a second four subsequent contrast sensitive orientations subsequent to but not consecutive with the first four consecutive contrast sensitive orientations, all added together, and there is a second group likewise including a first four consecutive contrast sensitive orientations and a second four subsequent contrast sensitive orientations subsequent to but not consecutive with the first four consecutive contrast sensitive orientations. The second group is subtracted from the first group.

For yet other bins, there is a first group including a first two consecutive contrast sensitive orientations, a second two consecutive contrast sensitive orientations subsequent to but not consecutive with the first two consecutive contrast sensitive orientations, a third two consecutive contrast sensitive orientations subsequent to but not consecutive with the second two consecutive contrast sensitive orientations, and a fourth two consecutive contrast sensitive orientations subsequent to but not consecutive with the third two consecutive contrast sensitive orientations, all added together. For these bins, there is a second group also including a first two consecutive contrast sensitive orientations, a second two consecutive contrast sensitive orientations subsequent to but not consecutive with the first two consecutive contrast sensitive orientations, a third two consecutive contrast sensitive orientations subsequent to but not consecutive with the second two contrast sensitive consecutive orientations, and a fourth two consecutive contrast sensitive orientations subsequent to but not consecutive with the third two consecutive contrast sensitive orientations, all added together. The second group is subtracted from the first group.

For still yet other bins, there is a first group including a first two consecutive contrast sensitive orientations, a second two consecutive contrast sensitive orientations subsequent to but not consecutive with the first two consecutive contrast sensitive orientations, a third two consecutive contrast sensitive orientations subsequent to but not consecutive with the second two consecutive contrast sensitive orientations, and a fourth two consecutive contrast sensitive orientations subsequent to but not consecutive with the third two consecutive contrast sensitive orientations, all added together. For these bins, there is a second group also including a first two consecutive contrast sensitive orientations, a second two consecutive contrast sensitive orientations subsequent to but not consecutive with the first two consecutive contrast sensitive orientations, a third two consecutive contrast sensitive orientations subsequent to but not consecutive with the second two consecutive contrast sensitive orientations, and a fourth two consecutive contrast sensitive orientations subsequent to but not consecutive with the third two consecutive contrast sensitive orientations, all added together. The second group is subtracted from the first group. In still further bins, a sum of nine nonconsecutive contrast sensitive orientations is subtracted from a sum of nine other nonconsecutive contrast sensitive orientations.

The contrast insensitive orientations are not used, while the gradient energy orientations are not transformed. A table of sample specific arithmetic operations performed under this third HOG descriptor compression method is given below, in which "Sn" (with "n" representing the orientation) is used for the contrast sensitive orientations, and "En" (with "n" also representing the orientation) is used for the gradient energy orientations.

| Fifth Transformation Method | |
|---|---|
| BIN1 | S1 − S18 > 0 |
| BIN2 | S2 − S1 > 0 |
| BIN3 | S3 − S2 > 0 |
| BIN4 | S4 − S3 > 0 |
| BIN5 | S5 − S4 > 0 |
| BIN6 | S6 − S5 > 0 |
| BIN7 | S7 − S6 > 0 |
| BIN8 | S8 − S7 > 0 |
| BIN9 | S9 − S8 > 0 |
| BIN10 | S10 − S9 > 0 |
| BIN11 | S11 − S10 > 0 |
| BIN12 | S12 − S11 > 0 |
| BIN13 | S13 − S12 > 0 |
| BIN14 | S14 − S13 > 0 |
| BIN15 | S15 − S14 > 0 |
| BIN16 | S16 − S15 > 0 |
| BIN17 | S17 − S16 > 0 |
| BIN18 | S18 − S17 > 0 |
| BIN19 | (S1 + S2 + S3 + S4 + S5 + S6 + S7 + S8 + S9) − (S10 + S11 + S12 + S13 + S14 + S15 + S16 + S17 + S18) > 0 |
| BIN20 | (S1 + S2 + S3 + S4 + S10 + S11 + S12 + S13) − (S5 + S6 + S7 + S8 + S14 + S15 + S16 + S17) > 0 |
| BIN21 | (S1 + S2 + S5 + S6 + S10 + S11 + S14 + S15) − (S3 + S4 + S7 + S8 + S12 + S13 + S16 + S17) > 0 |
| BIN22 | (S1 + S3 + S5 + S7 + S10 + S12 + S14 + S16f) − (S2 + S4 + S6 + S8 + S11 + S13 + S15 + S17) > 0 |
| BIN23 | E1 > threshold |
| BIN24 | E2 > threshold |
| BIN25 | E3 > threshold |
| BIN26 | E4 > threshold |

After transformation, the resulting bins are then binarized, as described above. The resulting bandwidth used to transmit the HOG descriptor when this transformation method is employed is lowered by a factor of 38.

A sixth transformation method is now described. In this transformation method, for some bins, subsequent contrast insensitive bins are subtracted from preceding contrast sensitive bins. For other bins, there is a first group of nine consecutive contrast sensitive bins that are added together, and there is a second group of nine consecutive contrast sensitive bins successive to the bins of the first group that are added together. The second group is subtracted from the first group. For some other bins, there is a first group including a first four consecutive contrast sensitive bins and a second four consecutive contrast sensitive bins subsequent to but not consecutive with the first four consecutive contrast sensitive bins, all added together, and there is a second group likewise including a first four consecutive contrast sensitive bins and a second four contrast sensitive bins subsequent to but not consecutive with the first four consecutive contrast sensitive bins. The second group is subtracted from the first group.

For yet other bins, there is a first group including a first two consecutive contrast sensitive bins, a second two consecutive contrast sensitive bins subsequent to but not consecutive with the first two consecutive contrast sensitive bins, a third two consecutive contrast sensitive bins subsequent to but not consecutive with the second two consecutive contrast sensitive bins, and a fourth two consecutive contrast sensitive bins subsequent to but not consecutive with the third two consecutive contrast sensitive bins, all added together. For these bins, there is a second group also including a first two consecutive contrast sensitive bins, a second two consecutive contrast sensitive bins subsequent to but not consecutive with the first two consecutive contrast sensitive bins, a third two consecutive contrast sensitive bins subsequent to but not consecutive with the second two consecutive contrast sensitive bins, and a fourth two consecutive contrast sensitive bins subsequent to but not consecutive with the third two consecutive contrast sensitive bins, all added together. The second group is subtracted from the first group.

For still yet other bins, there is a first group including a first two consecutive contrast sensitive bins, a second two consecutive contrast sensitive bins subsequent to but not consecutive with the first two consecutive contrast sensitive bins, a third two consecutive contrast sensitive bins subsequent to but not consecutive with the second two consecutive contrast sensitive bins, and a fourth two consecutive contrast sensitive bins subsequent to but not consecutive with the third two consecutive contrast sensitive bins, all added together. For these bins, there is a second group also including a first two consecutive contrast sensitive bins, a second two consecutive contrast sensitive bins subsequent to but not consecutive with the first two consecutive contrast sensitive bins, a third two consecutive contrast sensitive bins subsequent to but not consecutive with the second two consecutive contrast sensitive bins, and a fourth two consecutive contrast sensitive bins subsequent to but not consecutive with the third two consecutive contrast sensitive bins, all added together. The second group is subtracted from the first group. In still further bins, a sum of nine nonconsecutive contrast sensitive bins is subtracted from a sum of nine other nonconsecutive contrast sensitive bins.

A table of sample specific arithmetic operations performed under this third HOG descriptor compression method is given below, in which "Sn" (with "n" representing the orientation) is used for the contrast sensitive bins, and "En" (with "n" also representing the orientation) is used for the gradient energy bins. The gradient energy bins are not transformed.

| Sixth Transformation Method | |
|---|---|
| BIN1 | I1 − I9 > 0 |
| BIN2 | I2 − I1 > 0 |
| BIN3 | I3 − I2 > 0 |
| BIN4 | I4 − I3 > 0 |
| BIN5 | I5 − I4 > 0 |
| BIN6 | I6 − I5 > 0 |
| BIN7 | I7 − I6 > 0 |
| BIN8 | I8 − I7 > 0 |
| BIN9 | I9 − I8 > 0 |
| BIN10 | (S1 + S2 + S3 + S4 + S5 + S6 + S7 + S8 + S9) − (S10 + S11 + S12 + S13 + S14 + S15 + S16 + S17 + S18) > 0 |
| BIN11 | (S1 + S2 + S3 + S4 + S10 + S11 + S12 + S13) − (S5 + S6 + S7 + S8 + S14 + S15 + S16 + S17) > 0 |
| BIN12 | (S1 + S2 + S5 + S6 + S10 + S11 + S14 + S15) − (S3 + S4 + S7 + S8 + S12 + S13 + S16 + S17) > 0 |
| BIN13 | (S1 + S3 + S5 + S7 + S10 + S12 + S14 + S16f) − (S2 + S4 + S6 + S8 + S11 + S13 + S15 + S17) > 0 |
| BIN14 | E1 > threshold |
| BIN15 | E2 > threshold |
| BIN16 | E3 > threshold |
| BIN17 | E4 > threshold |

After transformation, the resulting bins are then binarized, as described above. The resulting bandwidth used to transmit the HOG descriptor when this transformation method is employed is lowered by a factor of 58.

A seventh transformation method is now described. In this transformation method, for some bins, subsequent contrast insensitive orientations are subtracted from preceding contrast insensitive orientations. For other bins, a preceding but not consecutive contrast sensitive bin is subtracted from a succeeding but not consecutive contrast sensitive bin.

For yet other bins, there is a first group of nine consecutive contrast sensitive orientations that are added together, and there is a second group of nine consecutive contrast sensitive orientations successive to the orientations of the first group that are added together. The second group is subtracted from the first group. For some other bins, there is a first group including a first four consecutive contrast sensitive orientations and a second four consecutive contrast sensitive orientations subsequent to but not consecutive with the first four consecutive contrast sensitive orientations, all added together, and there is a second group likewise including a first four consecutive contrast sensitive orientations and a second four contrast sensitive orientations subsequent to but not consecutive with the first four consecutive contrast sensitive orientations. The second group is subtracted from the first group.

For yet other bins, there is a first group including a first two consecutive contrast sensitive bins, a second two consecutive contrast sensitive bins subsequent to but not consecutive with the first two consecutive contrast sensitive orientations, a third two consecutive contrast sensitive orientations subsequent to but not consecutive with the second two consecutive contrast sensitive orientations, and a fourth two consecutive contrast sensitive orientations subsequent to but not consecutive with the third two consecutive contrast sensitive orientations, all added together. For these bins, there is a second group also including a first two consecutive contrast sensitive orientations, a second two consecutive contrast sensitive orientations subsequent to but not consecutive with the first two consecutive contrast sensitive orientations, a third two consecutive contrast sensitive orientations subsequent to but not consecutive with the second two consecutive contrast sensitive orientations, and a fourth two consecutive contrast sensitive orientations subsequent to but not consecutive with the third two consecutive contrast sensitive orientations, all added together. The second group is subtracted from the first group.

For still yet other bins, there is a first group including a first two consecutive contrast sensitive orientations, a second two consecutive contrast sensitive orientations subsequent to but not consecutive with the first two consecutive contrast sensitive orientations, a third two consecutive contrast sensitive orientations subsequent to but not consecutive with the second two consecutive contrast sensitive orientations, and a fourth two consecutive contrast sensitive orientations subsequent to but not consecutive with the third two consecutive contrast sensitive orientations, all added together. For these bins, there is a second group also including a first two consecutive contrast sensitive orientations, a second two consecutive contrast sensitive orientations subsequent to but not consecutive with the first two consecutive contrast sensitive orientations, a third two consecutive contrast sensitive orientations subsequent to but not consecutive with the second two consecutive contrast sensitive orientations, and a fourth two consecutive contrast sensitive orientations subsequent to but not consecutive with the third two consecutive contrast sensitive orientations, all added together. The second group is subtracted from the first group. In still further bins, a sum of nine nonconsecutive contrast sensitive orientations is subtracted from a sum of nine other nonconsecutive contrast sensitive orientations.

A table of sample specific arithmetic operations performed under this third HOG descriptor compression method is given below, in which "Sn" (with "n" representing the orientation) is used for the contrast sensitive orientations, and "En" (with "n" also representing the orientation) is used for the gradient energy orientations. The gradient energy orientations are not transformed.

| | Seventh Transformation Method |
|---|---|
| BIN1 | I1 − I9 > 0 |
| BIN2 | I2 − I1 > 0 |
| BIN3 | I3 − I2 > 0 |
| BIN4 | I4 − I3 > 0 |
| BIN5 | I5 − I4 > 0 |
| BIN6 | I6 − I5 > 0 |
| BIN7 | I7 − I6 > 0 |
| BIN8 | I8 − I7 > 0 |
| BINS | I9 − I8 > 0 |
| BIN10 | S18 − S9 > 0 |
| BIN11 | S14 − S5 > 5 |
| BIN12 | (S1 + S2 + S3 + S4 + S5 + S6 + S7 + S8 + S9) − (S10 + S11 + S12 + S13 + S14 + S15 + S16 + S17 + S18) > 0 |
| BIN13 | (S1 + S2 + S3 + S4 + S10 + S11 + S12 + S13) − (S5 + S6 + S7 + S8 + S14 + S15 + S16 + S17) > 0 |
| BIN14 | (S1 + S2 + S5 + S6 + S10 + S11+ S14 + S15) − (S3 + S4 + S7 + S8 + S12 + S13 + S16 + S17) > 0 |
| BIN15 | (S1 + S3 + S5 + S7 + S10 + S12 + S14 + S16f) − (S2 + S4 + S6 + S8 + S11 + S13 + S15 + S17) > 0 |
| BIN16 | E1 > threshold |
| BIN17 | E2 > threshold |
| BIN1 | E3 > threshold |
| BIN2 | E4 > threshold |

After transformation, the resulting bins are then binarized, as described above. The resulting bandwidth used to transmit the HOG descriptor when this transformation method is employed is lowered by a factor of 52. The compressed HOG descriptors are then sent to the second processor (Step 224).

Due to the transformation and binarization, the compressed HOG descriptors are generated as binary values of the selected bins (Step 222). The subsequently described steps are performed by the second processor. The compressed HOG descriptors are received (Step 226), and are then aggregated into windows (Step 228). Each window is a subset of a given compressed HOG descriptor, with multiple windows for each compressed HOG descriptor. The windows are sized as 7×7 for the detection of cars, or 8×4 for the detection of humans. Each window is shifted from an adjacent window by one row or one column. However, different values for size and shift are possible.

Next, the data of each window of compressed HOG descriptor data is compared to a stored model (Step 230) to determine if a collision is impending. The data of each window of compressed HOG descriptor may be compared to multiple different stored models in some instances. In addition, the nature of an impending collision may be determined from these comparisons to models. For example, whether an impending collision is with a car or a human may be determined, with a comparison to a first model being made to detect impending collisions with cars, and with a comparison to a second model being made to detect impending collisions with humans.

Output is then generated indicating the impending collision (Step 232). This output may be passed to a display within the vehicle, or may be passed to a vehicle controller which receives the output (Step 234). The vehicle controller may then, as described above, control the vehicle so as to avoid the collision (Step 236), or lessen the impact of the collision.

While the disclosure has been described with respect to a limited number of embodiments, those skilled in the art, having benefit of this disclosure, will appreciate that other embodiments can be envisioned that do not depart from the scope of the disclosure as disclosed herein. Accordingly, the scope of the disclosure shall be limited only by the attached claims.

The invention claimed is:

1. A system situated in a vehicle, comprising:
a first processor situated in the vehicle and configured to:
  acquire frames of image data, and
  for each frame of data,
    generate a Gaussian pyramid for the frame of data,
    extract histogram of oriented gradient (HOG) descriptors for each level of the Gaussian pyramid, and separate the HOG descriptor for each level into a plurality of bins comprising contrast sensitive bins, contrast insensitive bins, and gradient energy bins,
    compress the HOG descriptors by selecting each contrast sensitive bin and each contrast insensitive bin, binarizing each HOG descriptor for each level such that each selected bin holds a binary value, and generating the compressed HOG descriptors as the binary values of the selected bins, wherein binarizing each HOG descriptor is performed by determining the binary values for the plurality of bins corresponding to that HOG descriptor by comparing each element of that HOG descriptor to a threshold value and generating the corresponding binary value based upon the comparison, and
    send the compressed HOG descriptors;
a second processor situated in the vehicle, coupled to the first processor, and configured to:
  receive the compressed HOG descriptors,
  aggregate the compressed HOG descriptors into windows,
  compare data of each window to at least one stored model, and
  generate output based upon the comparison.

2. The system of claim 1, wherein the output indicates an impending physical collision.

3. The system of claim 1, wherein the first processor is configured to select some of the plurality of bins by selecting each of the plurality of bins.

4. A system situated in a vehicle, comprising:
a first processor situated in the vehicle and configured to:
  acquire frames of image data, and
  for each frame of data,
    generate a Gaussian pyramid for the frame of data,
    extract histogram of oriented gradient (HOG) descriptors for each level of the Gaussian pyramid, and separate the HOG descriptor for each level into a plurality of bins comprising contrast sensitive bins, contrast insensitive bins, and gradient energy bins,
    compress the HOG descriptors by selecting each contrast sensitive bin and each gradient energy bin, binarizing each HOG descriptor for each level such that each selected bin holds a binary value, and generating the compressed HOG descriptors as the binary values of the selected bins, wherein binarizing each HOG descriptor is performed by determining the binary values for the plurality of bins corresponding to that HOG descriptor by comparing each element of that HOG descriptor to a threshold value and generating the corresponding binary value based upon the comparison, and
    send the compressed HOG descriptors;
a second processor situated in the vehicle, coupled to the first processor, and configured to:
  receive the compressed HOG descriptors,
  aggregate the compressed HOG descriptors into windows,
  compare data of each window to at least one stored model, and
  generate output based upon the comparison.

5. A system situated in a vehicle, comprising:
a first processor situated in the vehicle and configured to:
  acquire frames of image data, and
  for each frame of data,
    generate a Gaussian pyramid for the frame of data,
    extract histogram of oriented gradient (HOG) descriptors for each level of the Gaussian pyramid, and separate the HOG descriptor for each level into a plurality of bins comprising contrast sensitive bins, contrast insensitive bins, and gradient energy bins,
    compress the HOG descriptors by selecting each contrast sensitive bin, binarizing each HOG descriptor for each level such that each selected bin holds a binary value, and generating the compressed HOG descriptors as the binary values of the selected bins, wherein binarizing each HOG descriptor is performed by determining the binary values for the plurality of bins corresponding to that HOG descriptor by comparing each element of that HOG descriptor to a threshold value and generating the corresponding binary value based upon the comparison, and
    send the compressed HOG descriptors;
a second processor situated in the vehicle, coupled to the first processor, and configured to:
  receive the compressed HOG descriptors,
  aggregate the compressed HOG descriptors into windows,
  compare data of each window to at least one stored model, and
  generate output based upon the comparison.

6. A system situated in a vehicle, comprising:
a first processor situated in the vehicle and configured to:
  acquire frames of image data, and
  for each frame of data,
    generate a Gaussian pyramid for the frame of data,
    extract histogram of oriented gradient (HOG) descriptors for each level of the Gaussian pyramid, and separate the HOG descriptor for each level into a plurality of bins comprising contrast sensitive bins, contrast insensitive bins, and gradient energy bins,
    compress the HOG descriptors by selecting each contrast insensitive bin and each gradient energy bin, binarizing each HOG descriptor for each level such that each selected bin holds a binary value, and generating the compressed HOG descriptors as the binary values of the selected bins, wherein binarizing each HOG descriptor is performed by determining the binary values for the plurality of bins corresponding to that HOG descriptor by comparing each element of that HOG descriptor to a threshold value and generating the corresponding binary value based upon the comparison, and
send the compressed HOG descriptors;
a second processor situated in the vehicle, coupled to the first processor, and configured to:
receive the compressed HOG descriptors,
aggregate the compressed HOG descriptors into windows,
compare data of each window to at least one stored model, and
generate output based upon the comparison.

7. A system situated in a vehicle, comprising:
a first processor situated in the vehicle and configured to:
acquire frames of image data, and
for each frame of data,
generate a Gaussian pyramid for the frame of data,
extract histogram of oriented gradient (HOG) descriptors for each level of the Gaussian pyramid, and separate the HOG descriptor for each level into a plurality of bins comprising contrast sensitive bins, contrast insensitive bins, and gradient energy bins,
compress the HOG descriptors by selecting each contrast insensitive bin, binarizing each HOG descriptor for each level such that each selected bin holds a binary value, and generating the compressed HOG descriptors as the binary values of the selected bins, wherein binarizing each HOG descriptor is performed by determining the binary values for the plurality of bins corresponding to that HOG descriptor by comparing each element of that HOG descriptor to a threshold value and generating the corresponding binary value based upon the comparison, and
send the compressed HOG descriptors;
a second processor situated in the vehicle, coupled to the first processor, and configured to:
receive the compressed HOG descriptors,
aggregate the compressed HOG descriptors into windows,
compare data of each window to at least one stored model, and
generate output based upon the comparison.

8. A system situated in a vehicle, comprising:
a first processor situated in the vehicle and configured to:
acquire frames of image data, and
for each frame of data,
generate a Gaussian pyramid for the frame of data,
extract histogram of oriented gradient (HOG) descriptors for each level of the Gaussian pyramid, and separate the HOG descriptor for each level into a plurality of bins comprising contrast sensitive bins, contrast insensitive bins, and gradient energy bins, wherein each bin corresponds to an angle over which each HOG descriptor was taken,
compress the HOG descriptors by selecting at least some of the contrast sensitive bins corresponding to an angle of 20, 40, 80, 100, 140, 160, 200, 220, 260, 280, 320, and 340 degrees, by selecting at least some of the contrast insensitive bins corresponding to an angle of 0, 60, and 120 degrees, and by selecting at least some gradient energy bins, binarizing each HOG descriptor for each level such that each selected bin holds a binary value, and generating the compressed HOG descriptors as the binary values of the selected bins, wherein binarizing each HOG descriptor is performed by determining the binary values for the plurality of bins corresponding to that HOG descriptor by comparing each element of that HOG descriptor to a threshold value and generating the corresponding binary value based upon the comparison, and
send the compressed HOG descriptors;
a second processor situated in the vehicle, coupled to the first processor, and configured to:
receive the compressed HOG descriptors,
aggregate the compressed HOG descriptors into windows,
compare data of each window to at least one stored model, and
generate output based upon the comparison.

9. A system situated in a vehicle, comprising:
a first processor situated in the vehicle and configured to:
acquire frames of image data, and
for each frame of data,
generate a Gaussian pyramid for the frame of data,
extract histogram of oriented gradient (HOG) descriptors for each level of the Gaussian pyramid, and separate the HOG descriptor for each level into a plurality of bins comprising contrast sensitive bins, contrast insensitive bins, and gradient energy bins, wherein each bin corresponds to an angle over which each HOG descriptor was taken,
compress the HOG descriptors by selecting at least some of the contrast sensitive bins corresponding to an angle of 0, 60, 120, 180, 240, and 300 degrees, by selecting at least some of the contrast insensitive bins corresponding to 20, 40, 80, 100, 140, and 160 degrees, and by selecting at least some of gradient energy bins, binarizing each HOG descriptor for each level such that each selected bin holds a binary value, and generating the compressed HOG descriptors as the binary values of the selected bins, wherein binarizing each HOG descriptor is performed by determining the binary values for the plurality of bins corresponding to that HOG descriptor by comparing each element of that HOG descriptor to a threshold value and generating the corresponding binary value based upon the comparison, and
send the compressed HOG descriptors;
a second processor situated in the vehicle, coupled to the first processor, and configured to:
receive the compressed HOG descriptors,
aggregate the compressed HOG descriptors into windows,
compare data of each window to at least one stored model, and
generate output based upon the comparison.

10. A system situated in a vehicle, comprising:
a first processor situated in the vehicle and configured to:
acquire frames of image data, and
for each frame of data,
generate a Gaussian pyramid for the frame of data,
extract histogram of oriented gradient (HOG) descriptors for each level of the Gaussian pyramid,
compress the HOG descriptors for each level of the Gaussian pyramid by placing each HOG descriptor into a plurality of bins, transforming at least some bins, and binarizing each transformed bin so that each bin holds a binary value, wherein the transforming includes performing an arithmetic operation on each bin using at least one other bin as an operand, and
send the compressed HOG descriptors;
a second processor situated in the vehicle, coupled to the first processor and configured to:
receive the compressed HOG descriptors,
aggregate the compressed HOG descriptors into windows,
compare data of each window to at least one stored model, and
generate output based upon the comparison.

11. The system of claim 10, wherein the first processor is configured to binarize each HOG descriptor by determining the binary values for the plurality of bins corresponding to that HOG descriptor by comparing each element of that HOG descriptor to a threshold value and generating the corresponding binary value based upon the comparison.

12. The system of claim 10, wherein the plurality of bins is arranged as an array including contrast sensitive bins, contrast insensitive bins, and gradient energy bins.

13. The system of claim 12, wherein the first processor is configured to transform at least some bins by subtracting at least one subsequent bin from a preceding bin; and wherein the at least some bins include the contrast sensitive bins.

14. The system of claim 13, wherein the at least some bins also include the contrast insensitive bins.

15. The system of claim 12, wherein the first processor is configured to transform at least some bins by adding at least one subsequent bin to a preceding bin; wherein the at least some bins include the contrast sensitive bins.

16. The system of claim 15, wherein the at least some bins also include the contrast insensitive bins.

17. A method of image processing, comprising:
acquiring frames of image data from a camera; and
for each frame of data, using an image processing system for:
generating a Gaussian pyramid for the frame of data,
extracting histogram of oriented gradient (HOG) descriptors for each level of the Gaussian pyramid,
compressing the HOG descriptors,
aggregating the compressed HOG descriptors into windows,
comparing data of each window to at least one stored model, and
generating output based upon the comparison;
wherein the HOG descriptors for each level of the Gaussian pyramid are compressed by using the image processing system for placing each HOG descriptor into a plurality of bins, transforming at least some bins, binarizing each transformed bin so that each bin holds a binary value; and wherein the transforming includes performing an arithmetic operation on each bin using at least one other bin as an operand.

18. The method of claim 17, wherein the output indicates an impending physical collision.

19. The method of claim 17, wherein the HOG descriptor for each level is separated into a plurality of bins comprising contrast sensitive bins, contrast insensitive bins, and gradient energy bins; and wherein the HOG descriptors for each level of the Gaussian pyramid are compressed by using the image processing system for:
selecting some of the plurality of bins,
binarizing each HOG descriptor for each level such that each selected bin holds a binary value, and
generating the compressed HOG descriptors as the binary values of the selected bins.

20. The method of claim 19, wherein each HOG descriptor is binarized by using the image processing system for determining the binary values for the plurality of bins corresponding to that HOG descriptor by comparing each element of that HOG descriptor to a threshold value and generating the corresponding binary value based upon the comparison.

21. The method of claim 17, wherein each HOG descriptor is binarized by using the image processing system for determining the binary values for the plurality of bins corresponding to that HOG descriptor by comparing each element of that HOG descriptor to a threshold value and generating the corresponding binary value based upon the comparison.

22. A vehicle, comprising:
a body;
a camera carried by the body;
a first processor carried by the body, coupled to the camera, and configured to:
acquire frames of image data from the camera, and
for each frame of data,
generate a Gaussian pyramid for the frame of data,
extract histogram of oriented gradient (HOG) descriptors for each level of the Gaussian pyramid,
compress the HOG descriptors for each level of the Gaussian pyramid by placing each HOG descriptor into a plurality of bins, transforming at least some bins, binarizing each transformed bin so that each bin holds a binary value, wherein the transforming includes performing an arithmetic operation on each bin using at least one other bin as an operand, and
send the compressed HOG descriptors; and
a second processor carried by the body, coupled to the first processor, and configured to:
receive the compressed HOG descriptors,
aggregate the compressed HOG descriptors into windows,
compare data of each window to at least one stored model, and
generate output based upon the comparison.

23. The vehicle of claim 22, wherein the output indicates an impending physical collision of the vehicle.

24. The vehicle of claim 23, further comprising a collision avoidance system carried by the vehicle and configured to control the vehicle so as to avoid the impending physical collision.

25. A vehicle, comprising:
a body;
a camera carried by the body;
a first processor carried by the body, coupled to the camera, and configured to:
acquire frames of image data from the camera, and
for each frame of data,
generate a Gaussian pyramid for the frame of data,
extract histogram of oriented gradient (HOG) descriptors for each level of the Gaussian pyramid, wherein the HOG descriptor for each level is separated into a plurality of bins comprising contrast sensitive bins, contrast insensitive bins, and gradient energy bins,
compress the HOG descriptors for each level of the Gaussian pyramid by: selecting some of the plurality of bins, binarizing each HOG descriptor for each level such that each selected bin holds a binary value, and generating the compressed HOG descriptors as the binary values of the selected bins, and send the compressed HOG descriptors; and a second processor carried by the body, coupled to the first processor, and configured to:

receive the compressed HOG descriptors, aggregate the compressed HOG descriptors into windows, compare data of each window to at least one stored model, and generate output based upon the comparison.

26. The vehicle of claim 25, wherein the first processor is configured to binarize each HOG descriptor by determining the binary values for the plurality of bins corresponding to that HOG descriptor by comparing each element of that HOG descriptor to a threshold value and generating the corresponding binary value based upon the comparison.

* * * * *